(12) United States Patent
Miller et al.

(10) Patent No.: US 6,193,166 B1
(45) Date of Patent: Feb. 27, 2001

(54) SPRAY NOZZLE ARRANGEMENT

(75) Inventors: Paul Charles Harvey Miller, Haynes; Mark Edward Russell Paice, Hitchin, both of (GB)

(73) Assignee: BTG International Limited, London (GB)

( * ) Notice: Subject to any disclaimer, the term of this patent is extended or adjusted under 35 U.S.C. 154(b) by 0 days.

(21) Appl. No.: 09/372,092

(22) Filed: Aug. 11, 1999

Related U.S. Application Data

(63) Continuation of application No. PCT/GB98/00608, filed on Feb. 26, 1998.

(30) Foreign Application Priority Data

Feb. 28, 1997 (GB) .................................................. 9704179
Oct. 13, 1997 (GB) .................................................. 9721669

(51) Int. Cl.⁷ .............................. B05B 15/00; B05B 1/20; B05B 1/16; B05B 1/14
(52) U.S. Cl. ........................... 239/76; 239/163; 239/170; 239/556; 239/574
(58) Field of Search .................................. 239/61, 62, 68, 239/69, 76, 98–100, 101, 161, 163, 170, 171, 173, 176, 533.15, 556, 557, 574, 536, 601

(56) References Cited

U.S. PATENT DOCUMENTS

| | | | |
|---|---|---|---|
| 3,191,871 | * | 6/1965 | Palmer .................................... 239/69 |
| 3,715,080 | * | 2/1973 | Bastide ................................... 239/69 |
| 3,782,634 | * | 1/1974 | Herman ................................ 239/156 |
| 4,518,118 | * | 5/1985 | Takata ................................... 239/163 |
| 4,967,957 | * | 11/1990 | Bachman .............................. 239/62 |
| 5,184,775 | * | 2/1993 | Kerber .................................. 239/163 |
| 5,337,959 | * | 8/1994 | Boyd .................................... 239/163 |
| 5,971,294 | * | 10/1999 | Thompson et al. .................... 239/76 |

FOREIGN PATENT DOCUMENTS

1099902  *  6/1984  (SU) ...................................... 239/69

* cited by examiner

*Primary Examiner*—Andres Kashnikow
*Assistant Examiner*—Jorge S. Bocanegra
(74) *Attorney, Agent, or Firm*—Nixon & Vanderhye

(57) ABSTRACT

An assembly 10 fed by a pressurised pipe 2 and comprising three differently rated spray nozzles 11, 12, 13 is mounted on a spray boom so that 11, 12 and 13 traverse the same area. The nozzles 11, 12, 13 are independently remotely pneumatically controlled to give an overall spray rate range of from 0.4 to 2.5 liter/min., useful in precision farming.

13 Claims, 4 Drawing Sheets

SPRAY NOZZLE ARRANGEMENT

This application is a continuation of PCT/GB98/00608 filed Feb. 26, 1998.

This invention relates to a spray nozzle arrangement.

BACKGROUND OF THE INVENTION

For many purposes, especially in agriculture, it is desirable to be able to apply spray of a consistent mean droplet size and spray fan angle or cone angle, and evenly distributed, over a range of volumetric spray rates. For agricultural spray nozzles, spray output is classified by the British Crop Protection Council as Fine, Medium or Coarse based on mean droplet size, and chemical manufacturers may specify one of these classifications for applying their product.

However, a typical mass-produced flat-fan-spray nozzle cannot achieve the desired consistency if the flow rate deviates by more than 20% above or below its rated output, and even sophisticated nozzles cannot cope well with deviations beyond 30%.

A requirement for a wider range of flow rates can arise for example in so-called precision farming, that is, applying matter (such as fertiliser or weedkiller) to the ground in amounts varying from spot to spot according to the requirements ascertained from a previous mapping of the ground. The mapping and the application of matter can be made to coincide on the ground using global-positioning-satellite techniques.

BRIEF DESCRIPTION OF THE INVENTION

This invention accordingly seeks to provide a spray nozzle arrangement to widen the choice of flow rates available to the user while maintaining reasonable consistency in the physical characteristics of the spray.

In one aspect, the invention provides a manifold for a plurality of flat fan nozzles with means for orienting or retaining the nozzles parallel to each other but offset.

According to the present invention, a nozzle arrangement comprises a plurality of nozzles supplied by a common feed of material to be sprayed and separately or groupwise controlled to come on automatically individually and/or in such combinations as to spray at substantially any desired rate within a given range of volumetric flow rates while maintaining the common feed at a hydraulic pressure within a range in which all the nozzles which are switched on at a given time yield acceptable quality spray, the said range of flow rates being greater than that which would be achievable with a single nozzle whilst maintaining acceptable quality spray, each nozzle or group of nozzles being supplied through a valve which is remotely switchable; the valve may be an on-off valve, conveniently a pilot operated check valve (typically pneumatically controlled to switch it), although electric solenoid control can be envisaged. Such valves are economical, reliable, robust and already familiar in the spraying industry to stop spray nozzles from dripping when they are supposed to be off.

Preferably a plurality of the nozzles is of different volumetric ratings at the same hydraulic feed pressure.

For some purposes, a pressure reduction arrangement may be inserted between one or more of the nozzles and the common feed. This is a way to give greater flexibility in the selection of nozzles to give a desired spray-quality/flow-rate characteristic.

Control of the arrangement will normally be in response to a required spray rate, which may vary from time to time e.g. as the arrangement is moved from place to place in a field, varying according to previously stored information about different places in the field or spontaneously according to the operator's assessment as he drives a spraying machine with a spray boom carrying nozzle arrangements as set forth above across the field.

Normally, an acceptable spray quality is maintainable over at least a fourfold change in flow rate, and the four-fold change in flow rate is achievable within at most a 2½-fold change in the hydraulic feed pressure.

The nozzles preferably all have the same spray footprint, and may be flat-fan nozzles.

The invention extends to a spray boom or a section of a spray boom, having a plurality of nozzle arrangements according to any preceding claim, with common control lines to the corresponding nozzles in each of the arrangements, which boom or section may be connected to a tank supplying said common feed under a variable hydraulic pressure and having controllers for the nozzles and for said hydraulic pressure.

The invention also extends to a manifold (preferably for, or incorporated in, a nozzle arrangement as set forth above) for a plurality of flat fan nozzles, with means for orienting or retaining the nozzles parallel to each other but offset, wherein said means can retain each nozzle in only a single orientation, for example using bayonet lock arrangements.

BRIEF DESCRIPTION OF THE DRAWINGS

The invention will now be described by way of example with reference to the accompanying drawings, in which.

DETAILED DESCRIPTION OF PREFERRED EMBODIMENTS

Figure 1:
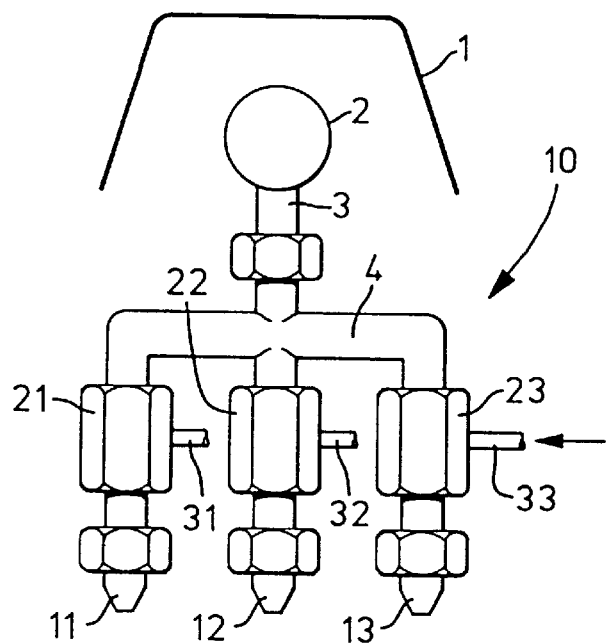
FIG. 1 shows a nozzle arrangement which can be connected or retrofitted to a conventional liquid spray line.

In FIG. 1, a nozzle arrangement 10 according to the invention is shown schematically, connected to a spray boom, which is viewed in section. Thus, a section 1 of a spray boom with a pressurised pipe 2 of liquid to be sprayed has a conventional nipple or union 3 to which the nozzle arrangement 10 is connected.

The arrangement 10 has an array of three conventional flat fan nozzles 11, 12, 13 mounted in line at right angles to the spray boom, in other words one behind the other in the direction of travel, so that each traverses the same track over the ground. Optionally (not illustrated), any of these nozzles 11, 12, 13 may be replaced by a group of nozzles, themselves also typically one behind the other.

Each nozzle 11, 12, 13 is supplied through a respective diaphragm control valve 21, 22, 23, each of which is actuated through respective pneumatic air lines 31, 32, 33.

The diaphragm control valves are supplied with liquid to be sprayed from a common manifold 4.

Figure 2:
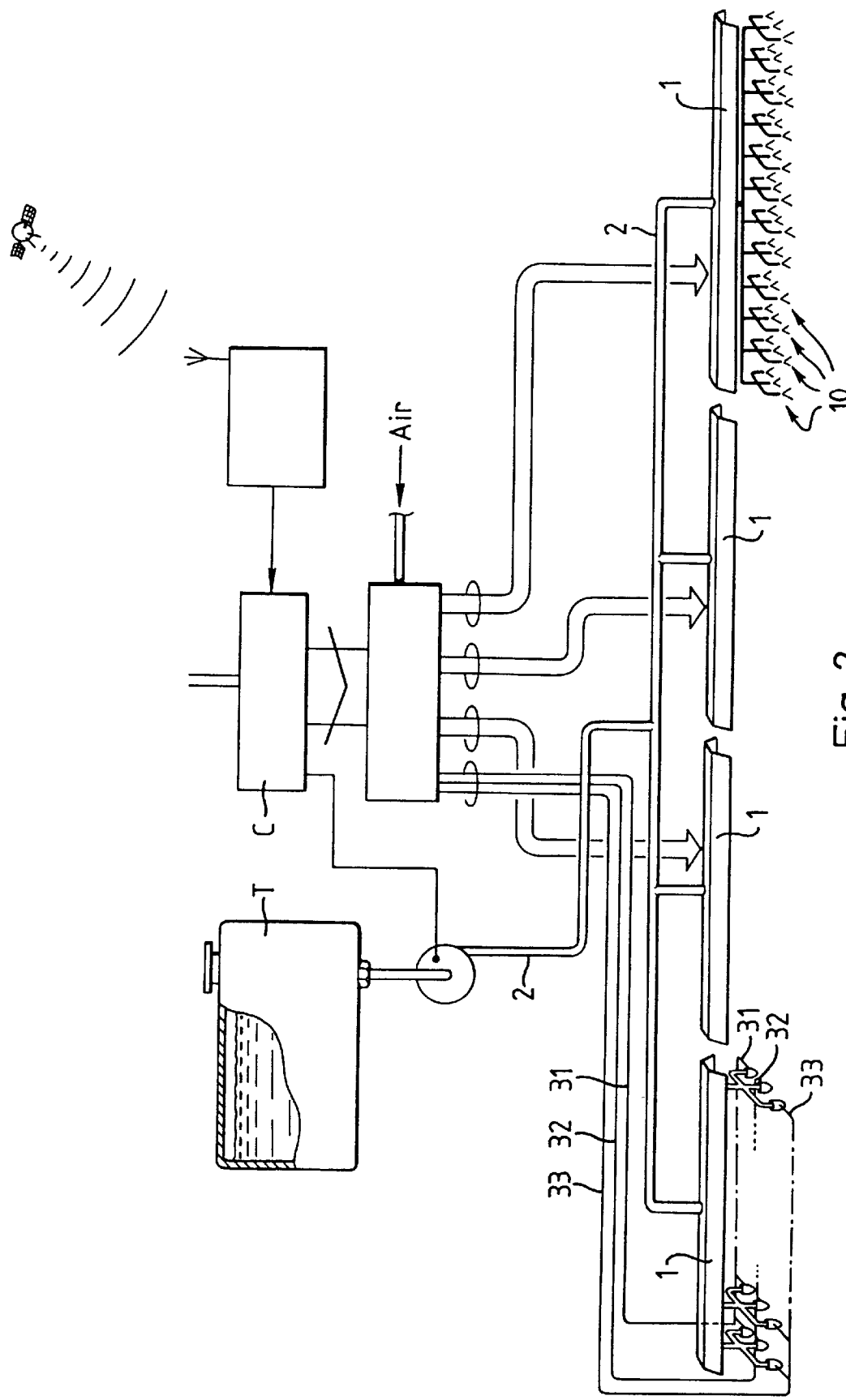
FIG. 2 shows a four-section spray boom with feed supply lines and pneumatic control lines, with a feed tank and controller, the whole being conveyed across a field.

A complete spray boom is shown schematically in FIG. 2, with four functionally identical sections 1 as shown in FIG. 1, viewed in elevation as if the spray boom were advancing towards the reader. Each of the four sections 1 carries twelve identical nozzle arrangements 10 (shown in fill on only the right-most section 1, for clarity). Each of the arrangements 10 on the section 1 is supplied with pressurised liquid through a common pipe 2 and with air pressure from 4 mm-internal-diameter air lines 31, 32, 33 independent of each other but common to all twelve arrangements 10, as shown enlarged and simplified on the left-most section 1.

Figure 3:
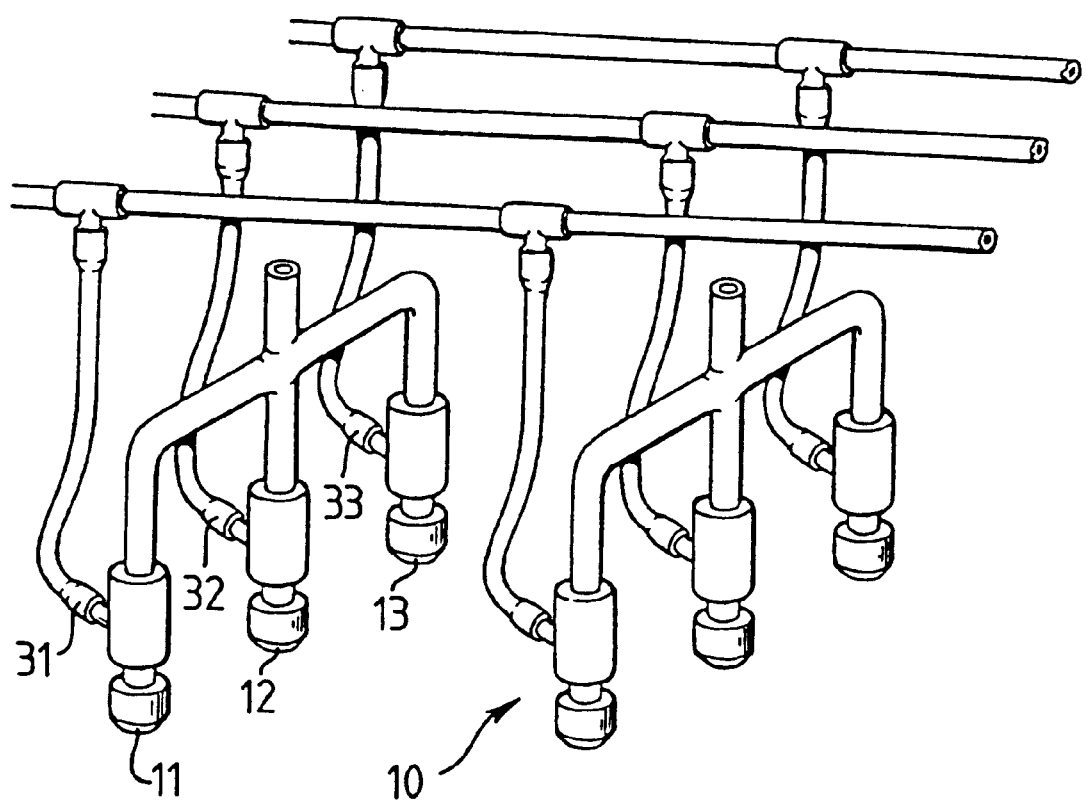
FIG. 3 shows in more detail supply and control connections of nozzle arrangements of FIG. 1 when fitted to the boom of FIG. 2.

FIG. 3 is an enlargement of the left-most two arrangements 10 shown in FIG. 2, clarifying the common air line 31 to the two nozzles 11, and likewise for 32→12 and 33→13. The common liquid pipe 2 to all nozzles is omitted for clarity.

Returning to FIG. 2, the other three boom sections 1 may be fed commonly or, for greater control (better focussing of liquid application rates), each boom section 1 may take an independent pressurised liquid feed from the others. As shown, each boom section 1 takes three air lines independent of the trio of air lines which each of the other boom sections takes.

For greater control still, the trio of air lines 31, 32, 33 (and the liquid feed pipe 2) need not be common to all twelve arrangements 10 on a section 1 but separate such trios and pipes may go to each of the twelve arrangements (or subgroups of the twelve) from a central tank T, air supply and controller C, which are typically mounted on or coupled directly to a tractor hauling the spray boom.

Figure 4:
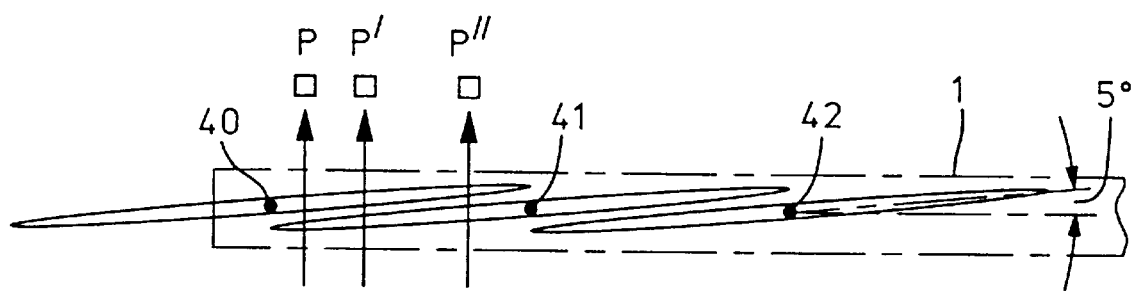
FIG. 4 shows in plan view how nozzles are mounted on a boom, not according to the invention.
Figure 5:
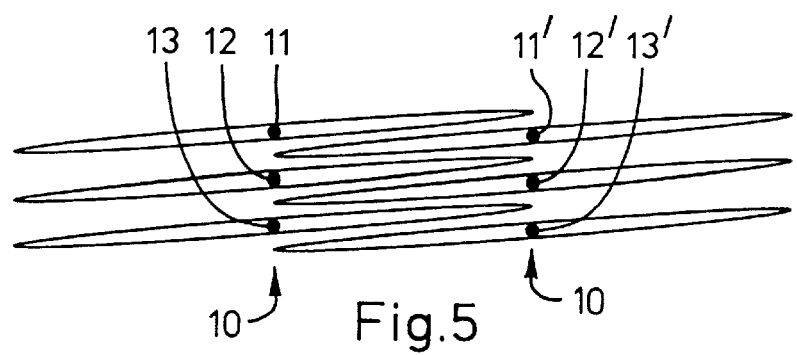
FIG. 5 shows, by way of comparison with FIG. 4, how the arrangement of FIG. 1 is mounted on the boom of FIG. 2.

FIG. 5 shows in plan view two adjacent arrangements 10 mounted on the section 1 of the spray boom. FIG. 4, not according to the invention, corresponds to FIG. 5 and is included by way of explanation.

Flat fan sprays are widely used in agriculture. Their spray footprint is approximately elliptical but highly elongated. Because such sprays would physically interfere with each other if their spray footprints overlapped, they are conventionally mounted angled by some 5° to the boom so as to avoid laterally neighbouring sprays while yet giving, when added to those neighbouring sprays, a constant spray rate at all points underneath the length of the spray boom.

Thus, in FIG. 4, neighbouring vertically-downward-aimed flat fan spray nozzles 40, 41, 42 having identical spray footprints are shown mounted on the section 1 of the spray boom, angled in conventional manner at 5° to the vertical plane including the boom. They are mounted at such a spacing, having regard to the intended boom height off the ground, that any unit area P on the ground receives the same volume of spray from the nozzles 40+41 after the boom has passed as does any other unit area P' or P" from whichever nozzle(s) overfly it.

Returning to FIG. 5, in accordance with the invention, a trio 10 of the nozzles already described 11, 12, 13 are mounted line astern, angled for the reasons explained in FIG. 4 at 5°, or for a greater clearance 10–20°, e.g. 15°, to the vertical plane including the boom. A neighbouring identical trio 10' of nozzles 11', 12', 13' is mounted at such a separation as to be capable of achieving the area uniformity of spray already explained, and so on along the boom. The nozzles 11, 12, 13, 11', 12' and 13' (and so on) are supplied from a common hydraulic feed line. The invention therefore provides a manifold for a plurality of flat fan nozzles with means for orienting or retaining the nozzles parallel to each other but offset. A bayonet lock or other aligning mechanism (not shown) ensures that each nozzle can be retained in only the correct orientation. Such a manifold, e.g. 4 of FIG. 1, considerably simplifies the assembly and ensures the accuracy of the arrangement 10.

The arrangement 10 is constructed and operates as follows. The nozzle 11 is rated at 0.5 liter/min at a hydraulic pressure of 2 bar (all ratings here are quoted at 2 bar unless otherwise stated), and the nozzle 11 can dispense spray of adequately consistent quality over a range of 0.4 liter/min at 1.2 bar to 0.55 liter/min at 2.5 bar.

The nozzle 12 is rated at 0.7 liter/min (dispensing 0.55 liter/min at 1.4 bar and 0.9 liter/min at 3.4 bar), and the nozzle 13 is rated at 1 liter/min (dispensing 0.9 liter/min at 1.5 bar and 1¼ liter/min at 3 bar).

When a flow rate of 0.4 liter/min is required from the arrangement 10, the controller C actuates the air line 31, thus opening the diaphragm check valve 21, and pressurises the pipe 2 to 1.2 bar. This being the minimum flow rate possible with this arrangement, lesser rates of material application entail either making do with nil application or speeding up the tractor to cover more ground per minute.

When a flow rate of 0.5 liter/min is required, the controller C increases the pressure in the pipe 2 to 2 bar.

When the required flow rate increases to beyond 0.55 liter/min, the controller C vents the air line 31 to atmosphere (to switch off the nozzle 11) and actuates the air line 32 (to switch on the nozzle 12), simultaneously dropping the pressure in the pipe 2 to 1.4 bar, whereby the required material is now dispensed at the required rate through the nozzle 12.

Likewise, when the required flow rate increases to beyond 0.9 liter/min, the controller C switches off the nozzle 12 in favour of the nozzle 13, while dropping the hydraulic pressure in the pipe 2 from 3.4 bar back to 1.6 bar.

Figure 6:
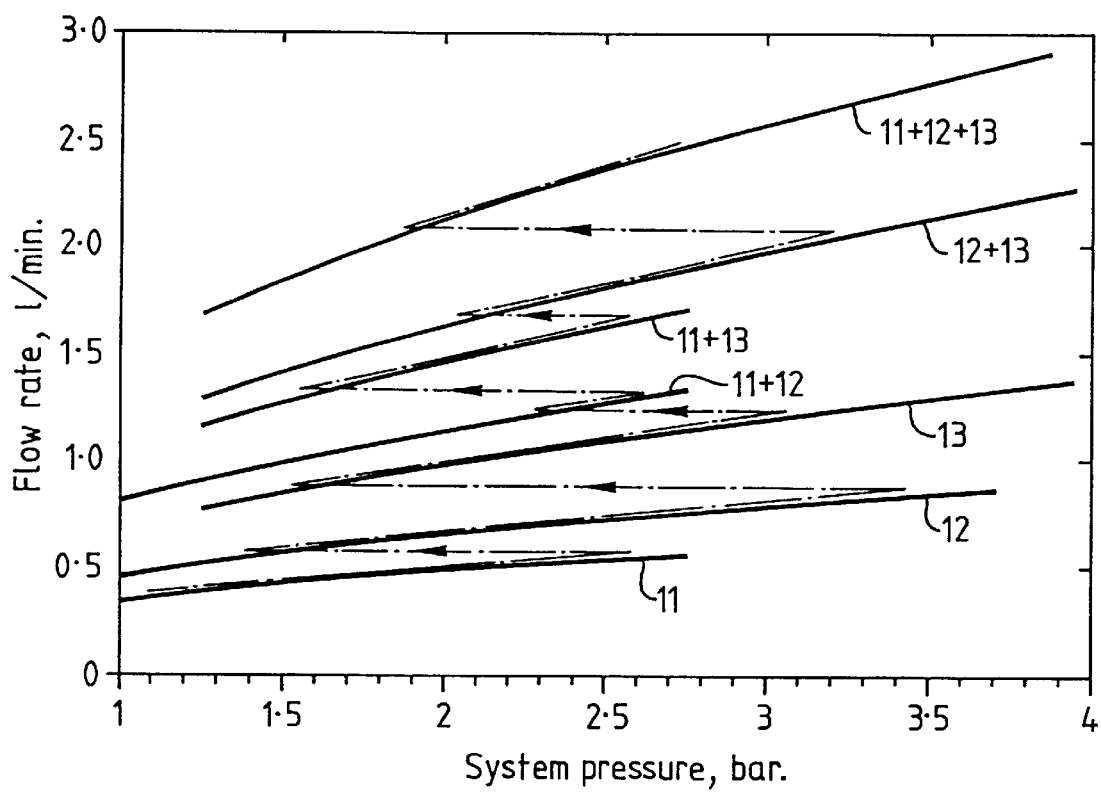
FIG. 6 shows a nozzle control regime for operating the nozzle arrangement according to the invention.

FIG. 6 shows the above ratings and performances graphically displayed on a single chart.

If even the nozzle 13, whose spray quality falls off above 1¼ liter/min (which it delivers at 3 bar), is inadequate for the requirement, then as shown in FIG. 6, the controller vents the air line 33, drops the hydraulic pressure to 2.3 bar and pressurises the air lines 31 and 32, thus switching on the nozzles 11 and 12 together.

By using all the combinations in turn of the available nozzles, as shown in FIG. 6, the three nozzles 11, 12, 13 can do duty at an acceptably consistent spray quality throughout the whole six-fold range of volumetric delivery rates from 0.4 liter/min up to 2.5 liter/min.

The controller C is preprogrammed with instructions corresponding to FIG. 6 to activate or vent the various pneumatic lines 31, 32, 33 and to adjust the hydraulic feed pressure over the less than 2½-fold range 1.5 to 3.2 bar to meet the volumetric delivery rate required at that moment. The controller is "told" what that required rate is either by a human operator assessing the situation as he sees it or by automated real-time sensing, or more usually is "told" with the aid of a map which was prepared earlier of the requirements of a field (e.g. the weed or pest distribution within that field, or the previous harvest yield distribution within that field).

Global position satellite technology is used to ascertain where the spray nozzle arrangement is at any moment in that field in relation to the map.

The spray nozzle arrangements are mounted on a spray boom hauled up and down the field by a tractor which also conveys a tank T of pesticide or fertiliser, a pump to pressurise the tank up to 3½ bar, liquid feed lines 2 from the tank to the spray boom, a source of compressed air, and pneumatic lines from that source, through solenoids operated by the controller C to selectively actuate desired diaphragm check valves through the air lines 31, 32 and 33 as required.

We claim:

1. Agricultural spraying apparatus for the precision application of agricultural chemicals, comprising:
   (a) a plurality of differently sized agricultural spray nozzles, each nozzle being capable of producing spray of substantially consistent droplet size over a predetermined range of volume flow rates at a corresponding predetermined range of supply pressures, said flow rate range being defined between predetermined upper and lower limits which are a maximum of 30% above or below a rated flow rate for the nozzle;
   (b) a common feed of material to be sprayed, said feed being connected to said nozzles via valves which are remotely switchable;
   (c) a control system for controlling both switching of said nozzles and pressure of said common feed such that each of said nozzles receives fluid at pressures only within said predetermined range of supply pressures appropriate to that nozzle, said control system being preprogrammed with said ranges;
   (d) whereby the apparatus is capable of providing at least a fourfold change in volume flow rate of its total spray output at said consistent droplet sizes.

2. A apparatus according to claim 1, wherein the valve is an on/off valve.

3. A apparatus according to claim 1, wherein a plurality of the nozzles is of different volumetric ratings at the same hydraulic feed pressure.

4. A apparatus according to claim 1, wherein all the nozzles have the same spray footprint.

5. A apparatus according to claim 1, wherein the switching of the valve is pneumatically controlled.

6. A apparatus according to claim 1, wherein the valve is a diaphragm check valve.

7. A apparatus according to claim 1, further comprising a pressure reduction arrangement between one or some of the nozzles and the common feed.

8. A apparatus according to claim 1, wherein the control is in response to a required spraying rate.

9. A apparatus according to claim 1, wherein the nozzles are flat fan nozzles.

10. A spray boom or a section of a spray boom, having a plurality of according to claim 1, with common control lines to the corresponding nozzles in each of the arrangements.

11. A boom or section according to claim 10, connected to a tank supplying said common feed under a variable hydraulic pressure and having controllers for the nozzles and for said hydraulic pressure.

12. A apparatus according to claim 1, comprising a manifold for a plurality of flat fan nozzles with means for orienting or retaining the nozzles parallel to each other but offset, wherein said means can retain each nozzle in only a single orientation.

13. A method of spraying liquid agricultural chemicals comprising the steps of:
   (a) providing:
      (i) an array of agricultural spray nozzles of different sizes, each operable within a respective predetermined pressure range to provide spray of substantially consistent droplet size over a respective predetermined range of volume flow rates, said flow rate range being defined between predetermined upper and lower limits which are a maximum of 30% above or below a rated flow rate for that nozzle;
      (ii) a common feed of material to be sprayed;
      (iii) a controller for controlling the pressure of said common feed and for controlling the switching in and out of said nozzles of different sizes;
   (b) by means of said controller, switching said nozzles in and out and adjusting said common feed pressure such that each nozzle is operated only within its respective pressure and volume flow rate ranges in order to provide spray of consistent droplet size over an at least fourfold total flow rate range.

* * * * *